United States Patent
Marcu

Patent Number: 5,591,278
Date of Patent: Jan. 7, 1997

[54] WHEELS FOR THE TUBULAR TRANSPORT

[76] Inventor: Mihail I. Marcu, 6 Norfolk St. N, Hamilton Ontario, Canada, L8S 3K1

[21] Appl. No.: 318,099

[22] Filed: Oct. 5, 1994

[51] Int. Cl.$^6$ ............................................. B60C 7/00
[52] U.S. Cl. .................. 152/152.1; 152/323; 152/DIG. 2
[58] Field of Search ................ 152/323, DIG. 2, 152/DIG. 4, 151, 152.1; 301/5.3, 64.7, 86; 414/279, 352; 299/64; 295/30.1, 30; 492/59; 474/161

[56] References Cited

U.S. PATENT DOCUMENTS

| | | | |
|---|---|---|---|
| 2,497,224 | 2/1950 | Laure | 301/64.7 |
| 2,757,054 | 7/1956 | Warker | 301/64.7 |
| 2,841,405 | 7/1958 | Jones et al. | 301/64.7 |
| 2,935,357 | 5/1960 | Sutowski | 301/64.7 |
| 3,583,621 | 6/1971 | Bryant | 226/189 |
| 3,630,098 | 12/1971 | Oxley | 474/161 |
| 4,203,509 | 5/1980 | Thompson et al. | 193/37 |
| 4,244,413 | 1/1981 | Takahashi et al. | 152/323 |

Primary Examiner—Geoffrey L. Knable

[57] ABSTRACT

A new type of wheel for tube transport is proposed characterized by the fact that is made of a rigid polymer material like high impact nylon which has uniformly distributed in it a solid lubricant like Teflon, MOS2 or graphite, by this reducing the hysteresis, fatigue in the mass and decreasing the rolling coefficient when rolling on a curved profile; also in the said polymer material existing fibres for reinforcing and static dissipation.

18 Claims, 1 Drawing Sheet

WHEELS FOR THE TUBULAR TRANSPORT

BACKGROUND OF THE INVENTION

The invention relates to wheels for tubular transport particularly for round tubular guideways.

DESCRIPTION OF THE PRIOR ART

There are known wheels for tube transport made of rubber or polyurethane rolling directly on the tube and steel wheels rolling on rails inside of the tube.

The wheels made of rubber or polyurethane have a round profile to cope with the inner surface of the tube. These wheels are elastic and present also a phenomenon of hysteresis. In the process of rolling a heat core can develop which some times reaches temperatures in excess of 120 degrees Celsius, and because of that they have the tendency to melt. In the process of rolling, each point of the circumference of these wheels is exposed to compression and relaxation which is essentially an intensive fatigue cycle reaching in the majority of applications over 200,000,000 cycles per year continuously.

So if by design the load is decreased and the hysteresis melting is avoided, the wheel is exposed to a fatigue cycle which is happening in the mass of the tire and finally the wheel is developing fatigue cracks and consequently the wheel fails, usually under a year of operation.

Another aspect is that the rolling contact is on a curve with a radius equal with the radius of the inner surface of the tube. Because of this, and because there is only one angular speed of the wheel, we have different speeds in the rolling contact area. For example if the middle point has an instant speed zero (in that moment is the instant centre of rotation), then the edges of the wheel can have a difference of speed going up to 0.3–0.4 m/s when the wheel is moving with 12–14 m/s in a tube having a diameter of 1 m.

This is generating stress, heat and is diminishing the life of the wheel. The rubber and polyurethane wheels are wearing about 1 mm for 20,000 km of rolling.

The above aspects made the rubber or polyurethane wheel improper for heavy duty applications for tube transport, where it is necessary to operate day and night without supervision 24 hours per day for years.

Also the wheels for a tube transport in a mining application are in the thousands so changing them at least once per year is a major problem for the operator. Another disadvantage of the rubber or polyurethane wheels is that they have a high rolling coefficient affecting the energy consumption.

Another difficulty associated with these known wheels is that the acceptable contact pressure is maximum 1000 psi, limiting the load per wheel at 25 mph to about 0.7 tons (for a rolling diameter of 16"). Also these wheels deflect under load affecting the sealing coefficient, the so called CD factor, limiting it to about 500.

The above disadvantages were the major reasons why the large diameter pneumatic tube transport systems were not applied extensively despite their apparition on the market over 10 years ago.

A solution to these difficulties was proposed: introducing rails inside of the tube. However this proved very expensive because of the difficulties associated with the installation of the rails in the tube.

The problem of the wheel for the tubular transport proved to be essential and was perceived as a stringent objective to be solved for over 20 years (since 1971 when the first tube system was built in the former USSR).

Summarizing the above:

The known rubber or polyurethane wheels have the following disadvantages:

a) they develop fatigue cracks in the whole mass of material, being necessary to change them at least once per year.

b) they can develop hysteresis melting making the system unpredictable and prone to tube blockage.

c) present excessive wear by the friction in the rolling contact (because the friction coefficient is 0.3–0.4), and from this point of view also need to be changed at least once per year.

d) they deflect too much generating a low sealing coefficient and requiring a lot of energy for propulsion.

e) present a high rolling coefficient and usually 3 rolling coefficients: one in cruise phase, one after about 10 minutes of stopping which is about double the cruise one and one after half of a day of stopping or more which is 3 times higher than the cruise one. All these requiring a lot of energy for propulsion and restarting.

f) the solution based on steel wheels is very expensive.

SUMMARY OF THE INVENTION

In aim to solve the above disadvantages, which plagued the tube transport industry for over 20 years, and to provide to the tube transport industry a class of wheels able to qualify for day and night operation for years in mining applications, a new class of wheels for tube transport is proposed which is made of:

a rigid polymer material e.g. high impact nylon, by this the hysteresis and fatigue are moved to the surface area where we have normal pitting flakes as wear not fatigue cracks and melting; also by rigidity we reduce the rolling coefficient and increase the sealing factor (rolling coefficient reduced 3 times, the sealing factor increased 40 times);

whereby the rigid polymer material having in it a solid lubricant e.g. Teflon (polytetrafluoroethylene) or MOS2 (molybdenum disulfide) graphite or even oil, the friction coefficient of the resulted rigid polymer material with solid lubricant being (for steel contact) less than 0.14, by this the heat generated in the rolling contact area being reduced substantially and hence the wear;

carbon fibres or fibreglass for reinforcement placed in the mass of the wheel;

a conductive material to reduce/eliminate Corona effect e.g. graphite or metallic fibres; Tests were made with such a wheel and the results were simply spectacular—the life of the wheel being in excess of 15 years of continuous operation under maximum load; also the hysteresis is totally eliminated or simply moved to the surface; the fatigue cracks also being totally eliminated; the rolling coefficient is reduced 3 times (compared with the rubber or polyurethane wheel).

Another spectacular advantage of this class of wheels is that at the rolling contact pressures normally experienced in the tubular transport this class of wheels is outperforming steel wheel at least 5 times in terms of durability.

It is not exaggerated to say that this class of wheels is as important for the tubular transport as the tungsten carbide for the machine tools industry.

BRIEF DESCRIPTION OF THE DRAWING

An example of the Preferred Embodiments is illustrated in FIG. 1 which is representing.

DESCRIPTION OF THE PREFERRED EMBODIMENTS

Figure 1:
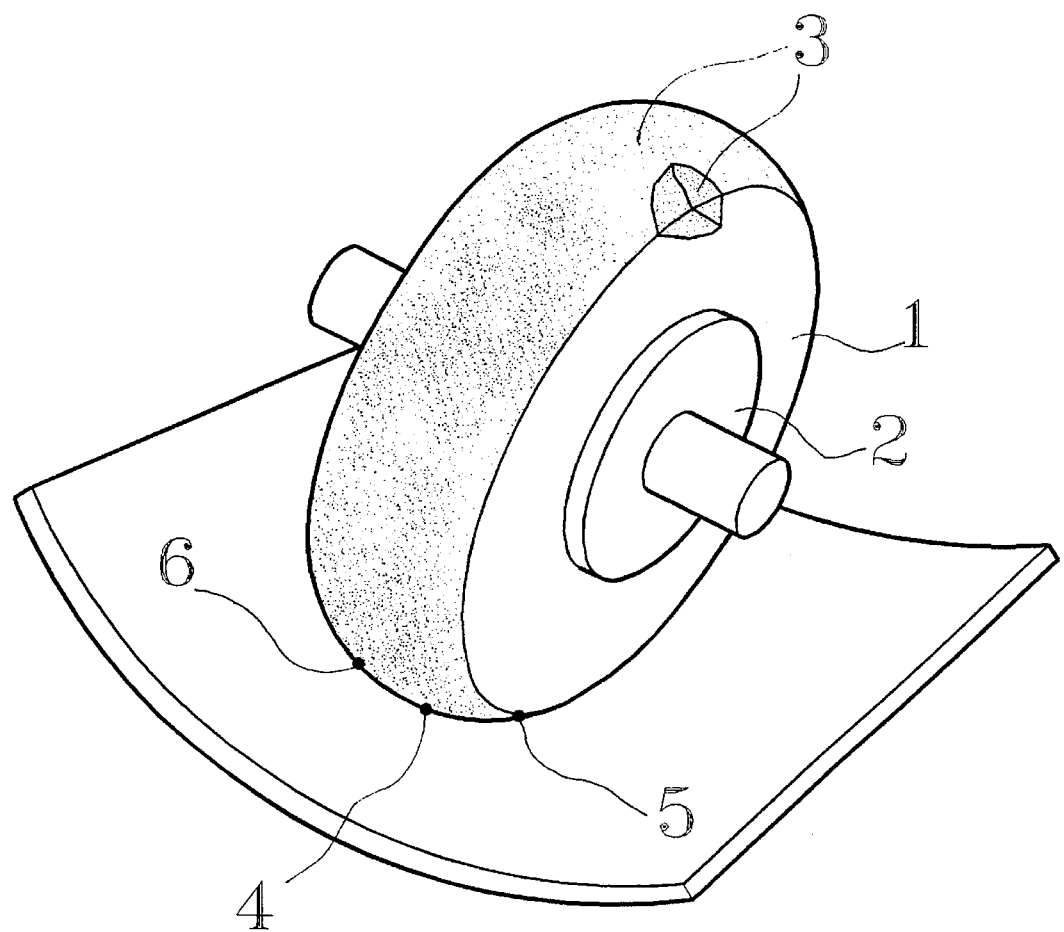
FIG. 1—Perspective view of the wheel.

As it is seen in the FIGURE, the wheel in fact is a solid tire, having a blank (1) applied to a hub (2). The solid lubricant (3) is distributed uniformly in the mass of the material. Note the concept of the instant centre of rotation (4) and the speed difference in the rolling contact—(5) and (6).

I claim exclusive privilege under the law for the following:

1. In a tubular transport device, the improvement comprising:
   a wheel including a solid tire composed of:
   a rigid, low hysteresis polymer material wherein any hysteresis and fatigue is concentrated at the surface of the tire;
   a lubricant uniformly distributed inside of the rigid polymer material;
   wherein the friction coefficient of the tire with a steel surface is less than 0.14.

2. A tubular transport device as in claim 1, in which the rigid polymer material is high impact nylon.

3. A tubular transport device as in claim 2, further comprising electric conductive material uniformly distributed inside the rigid polymer material.

4. A tubular transport device as in claim 3, in which the electric conductive material is graphite fibers or metallic fibers.

5. A tubular transport device as in claim 2, further comprising fibers for reinforcement uniformly distributed inside the rigid polymer material.

6. A tubular transport device as in claim 5, in which the fibers are carbon fibers or glass fibers.

7. A tubular transport device as in claim 1, in which the lubricant is molybdenum disulfide, oil, polytetrafluoroethylene or graphite.

8. A tubular transport device as in claim 7, further comprising electric conductive material uniformly distributed inside the rigid polymer material.

9. A tubular transport device as in claim 8, in which the electric conductive material is graphite fibers or metallic fibers.

10. A tubular transport device as in claim 1, further comprising fibers for reinforcement uniformly distributed inside the rigid polymer material.

11. A tubular transport device as in claim 10, further comprising electric conductive material uniformly distributed inside the rigid polymer material.

12. A tubular transport device as in claim 11, in which the electric conductive material is graphite fibers or metallic fibers.

13. A tubular transport device as in claim 4, in which the fibers are carbon fibers or glass fibers.

14. A tubular transport device as in claim 13, further comprising electric conductive material uniformly distributed inside the rigid polymer material.

15. A tubular transport device as in claim 14, in which the electric conductive material is graphite fibers or metallic fibers.

16. A tubular transport device as in claim 1, further comprising electric conductive material uniformly distributed inside the rigid polymer material.

17. A tubular transport device as in claim 16, in which the electric conductive material is graphite fibers or metallic fibers.

18. In a tubular transport device, the improvement comprising:
   a wheel including a solid tire composed of:
   a rigid, low hysteresis polymer material of high impact nylon wherein any hysteresis and fatigue is concentrated at the surface of the tire;
   a lubricant uniformly distributed inside of the rigid polymer material, the lubricant being molybdenum disulfide, oil, polytetrafluoroethylene or graphite;
   fibers for reinforcement uniformly distributed inside the rigid polymer material, the fibers being carbon fibers or glass fibers;
   electric conductive material uniformly distributed inside the rigid polymer material, the electric conductive material being graphite fibers or metallic fibers;
   wherein the friction coefficient of the tire with a steel surface is less than 0.14.

* * * * *